Patented Aug. 31, 1926.

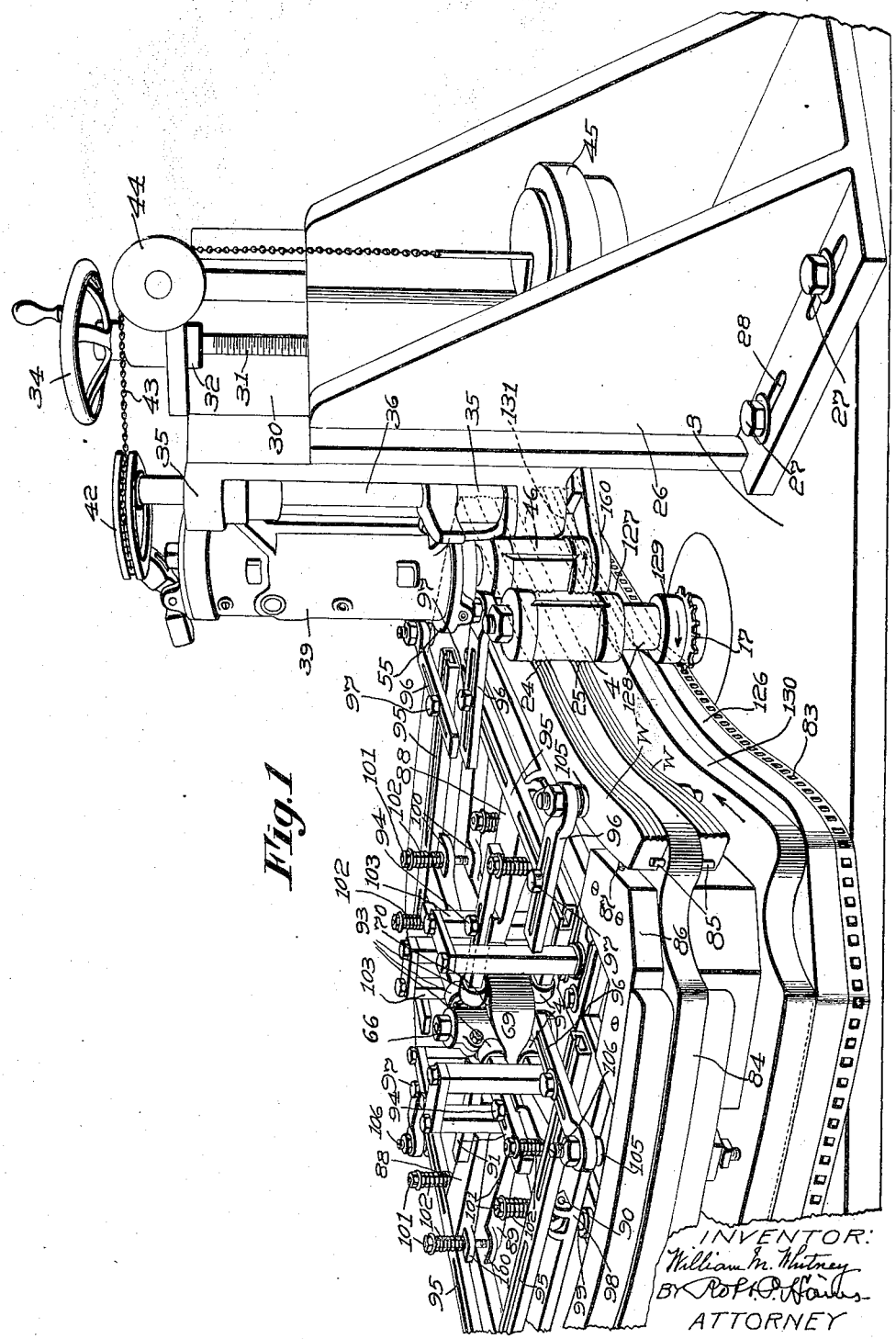

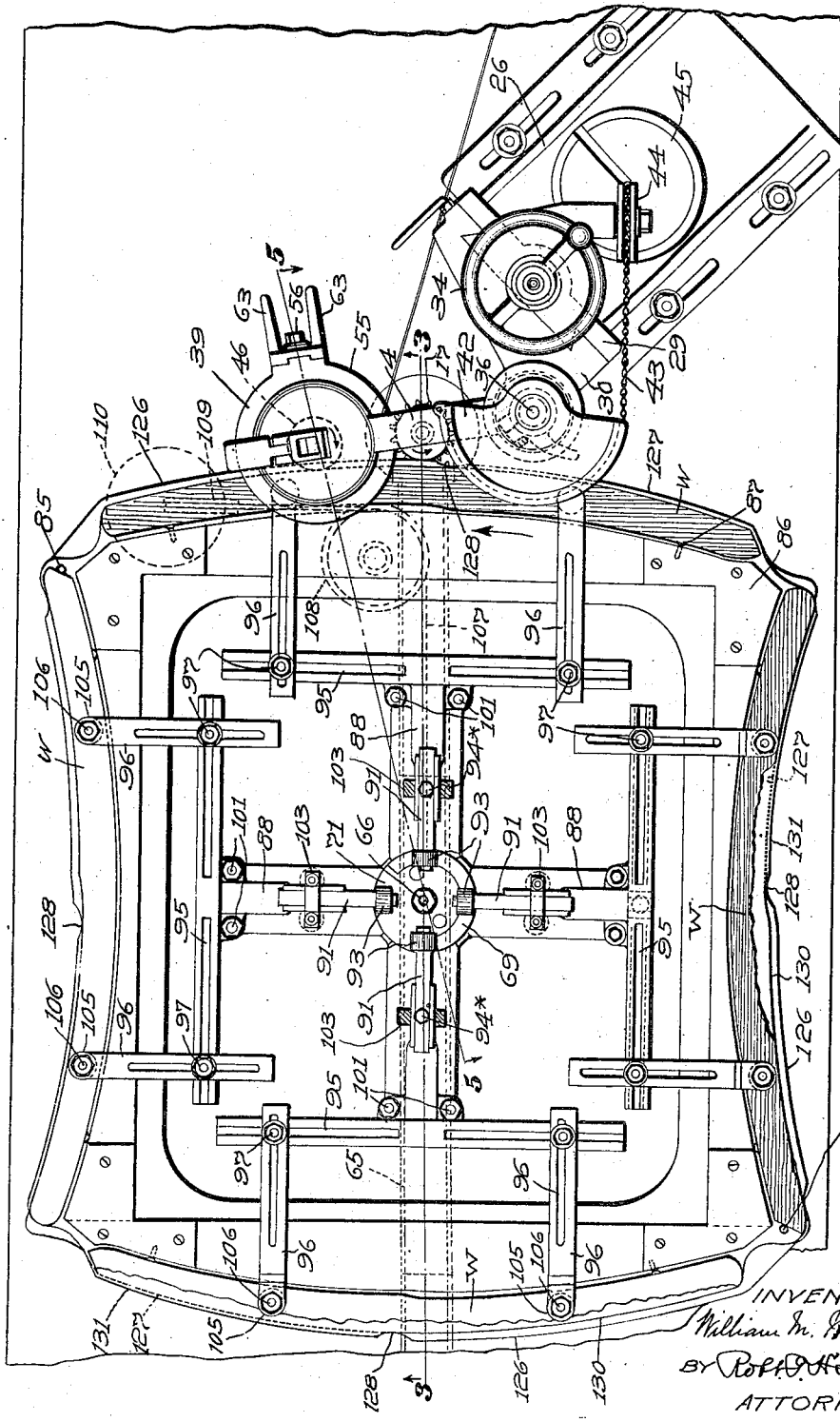

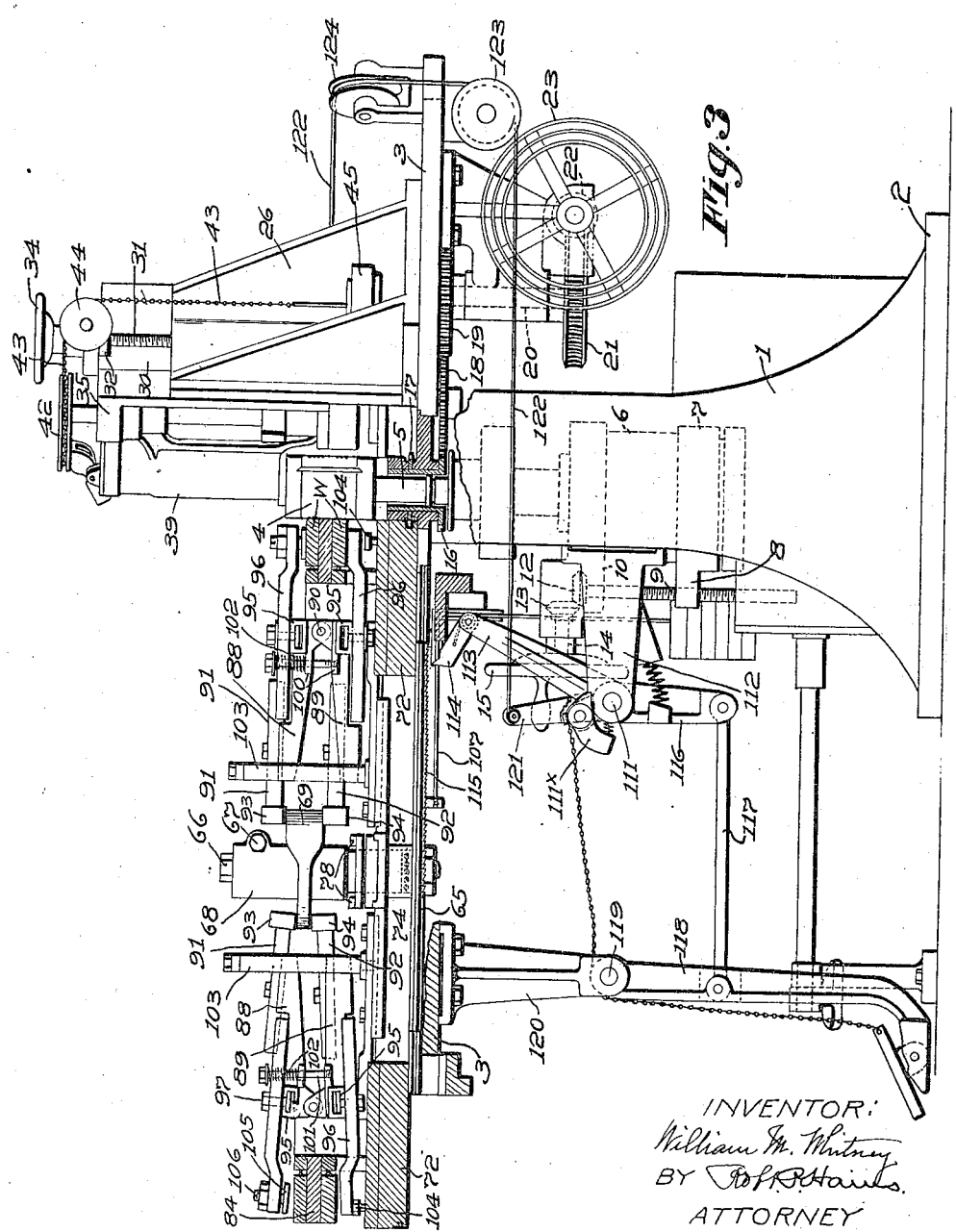

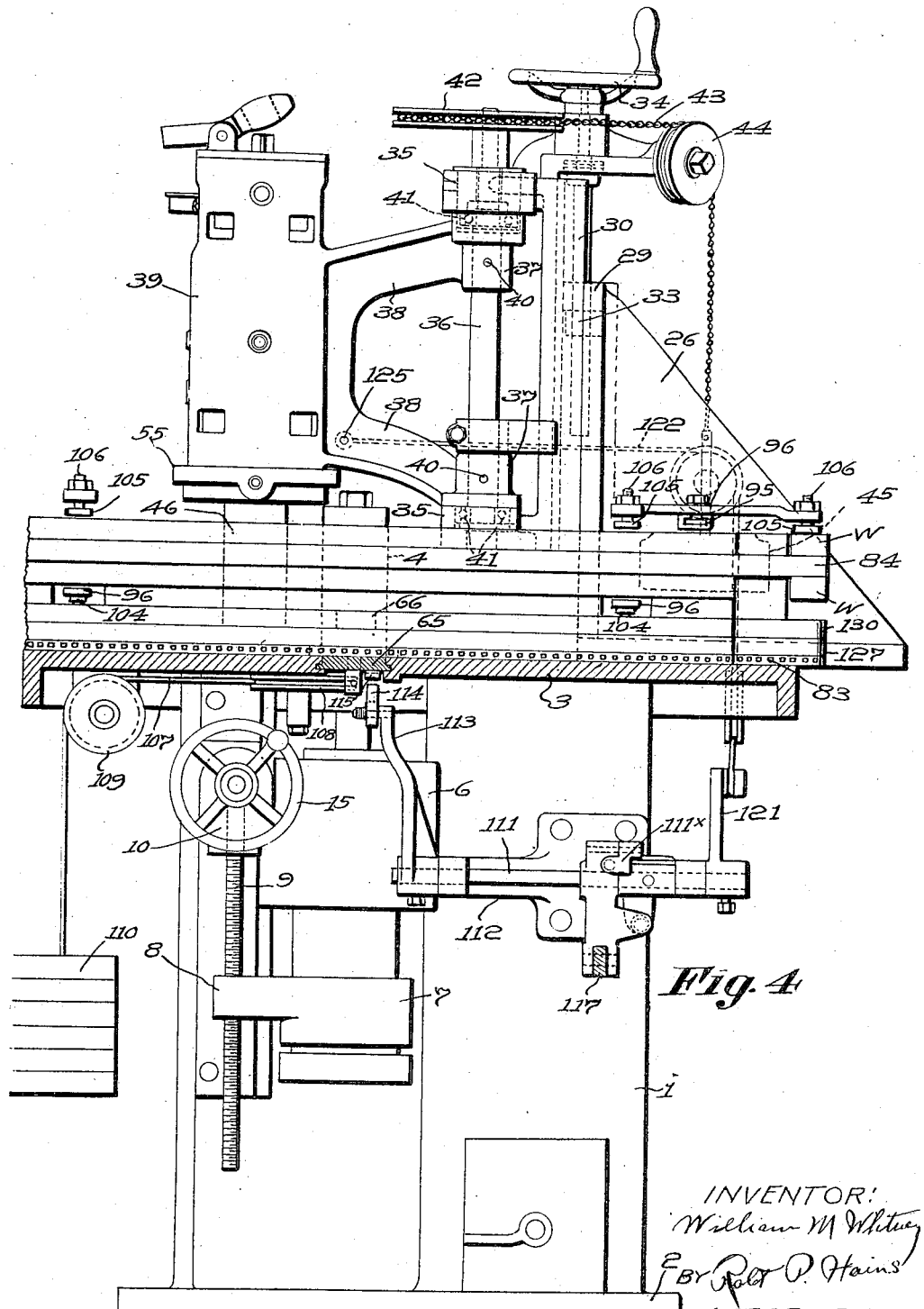

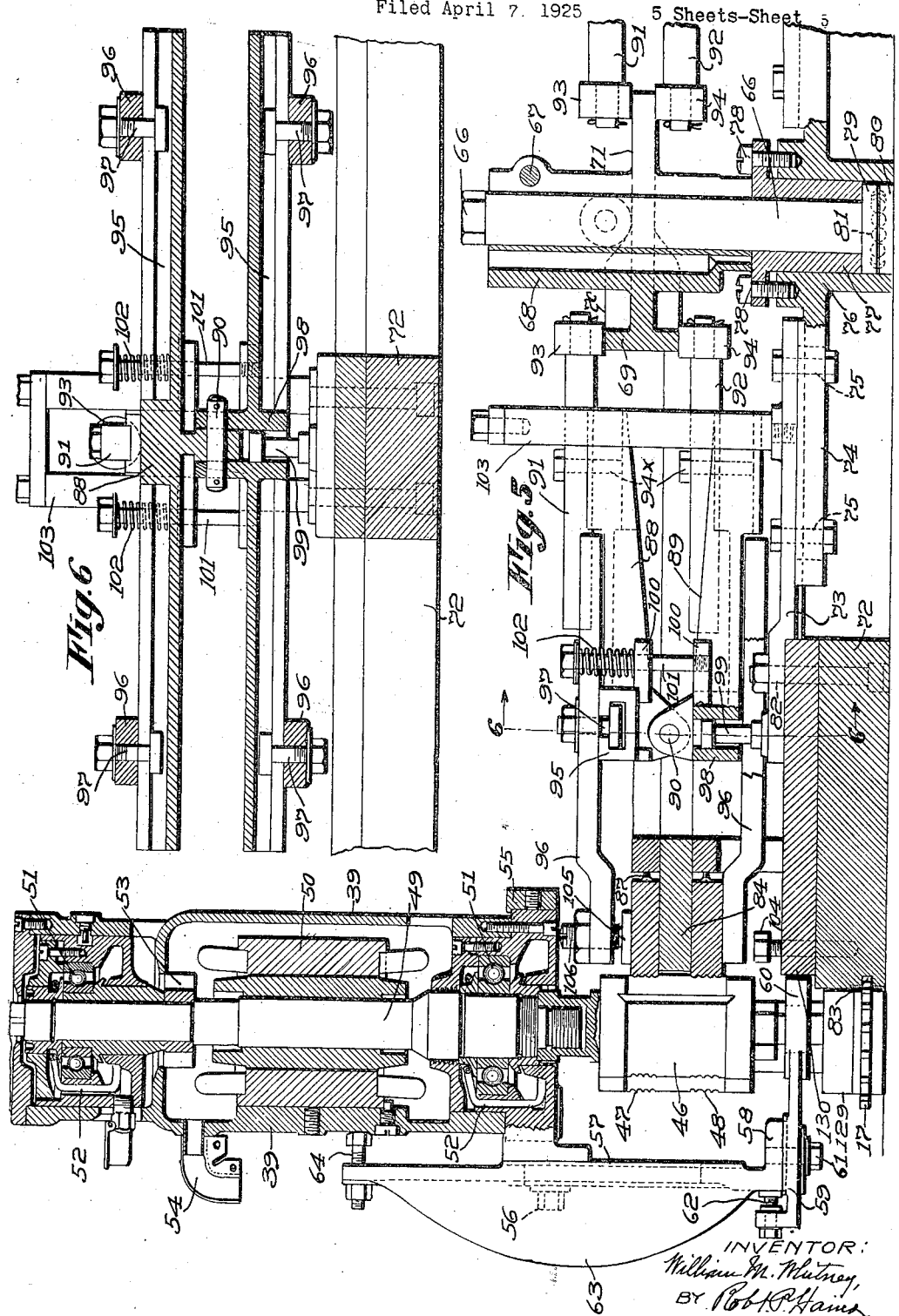

1,597,748

UNITED STATES PATENT OFFICE.

WILLIAM M. WHITNEY, OF WINCHENDON, MASSACHUSETTS.

WOOD-SHAPING MACHINE.

Application filed April 7, 1925. Serial No. 21,305.

This invention relates to wood working machines and more particularly machines for shaping wooden blanks to impart thereto shaped surfaces in conformation with a predetermined form or character.

In machines of this general type it is now the ordinary practice to subject work to the action of a cutter which rotates at high speed and constantly in one direction, and to present the work to such cutter that the latter may act upon the work in the direction of the grain. Where the grain of the work changes, however, it is now the general custom to move the work from its operative relation with one cutter and present it independently to another cutter rotating in the reverse direction, and which therefore acts upon the work in the direction of the grain to complete the surface to be shaped.

The present invention differs from such prior machines and has for its object to provide a wood shaping machine which will complete the shaping of the work by a single passage of the work past at least two cutters, one of which acts on a part of the surface to be shaped, and the other of which acts upon another part of the work to complete the shaped surface.

In accordance with the present invention, the work is mounted upon the work carrier and means are provided to present the work to the action of either of at least two cutters which are automatically controlled in their action upon the work to alternately treat the work in different portions thereof. An important feature of the present invention consists of a work carrier and means for constantly moving the carrier past two cutters which are controlled as to their action upon the work automatically in accordance with the grain of the work.

Inasmuch as the work is to be treated first by one and then by another of two cutters as the work is constantly fed past the cutters, it is desirable that at least one of the cutters shall be mounted for movement towards and from the work and controlled in such movement automatically to thereby determine in accordance the time at which such movable cutter shall act upon the work and coincidently therewith or following the movement of the movable cutter into operative relation with the work, to remove the work from the action of the companion cutter, the effect being that during the passage of the work past the two cutters, first one and then the other of the cutters shall be automatically brought into action to treat the work in the direction of the grain of the work to complete the shaping of the surface thereof.

In carrying this feature of the invention into practical effect, the work carrier is provided with a pattern formed in accordance with the shape of the surface to be imparted to the work, and means are provided for automatically controlling the alternate action of the cutters upon the work in accordance with the pattern, the effect being that upon a single passage of the work past the cutters, produced by movement of the work carrier, the surface of the work will be completely shaped by the alternate action of the two cutters.

Another important feature of the present invention consists of a work carrier having a track or cam formed on or secured to the carrier for controlling the alternate action of cutters as the work is moved past the cutters.

In accordance with the present invention, the work carrier is provided with means for clamping the work upon the carrier and holding it clamped during the passage of the work past the cutters, and means are provided for automatically causing the clamps to close upon the work and to release the work as the work carrier is moved, the effect being that the clamp will automatically engage the work as the work is being moved to presentation position relative to the cutters, and when the work has been shaped and it is moved to an inoperative position relative to the cutters, that the clamp will release the work for removal.

It is desirable at times to move the carrier away from the cutters, and inasmuch as one of the cutters is normally under the influence of means yieldingly tending to move the movable cutter towards the work, the present invention contemplates means for removing the movable cutter away from the work as the work carrier is moved away from presentation position.

The invention, the novel combination of parts and new features thereof will best be made clear from the following description and the accompanying drawings of one good form of the invention, it being understood that in its true scope the invention is definitely described by the claims.

In the drawings:

Fig. 1 is a perspective view of a wood working machine containing the present invention, some of the parts being omitted and others broken away for clearness of illustration;

Fig. 2 is a plan view of the parts indicated in Fig. 1;

Fig. 3 is a section on the line 3—3 of Fig. 2;

Fig. 4 is a front view of the machine shown in Figs. 1 and 2 with the table shown in section to reveal the work carrier slide;

Fig. 5 is a section on the line 5—5 of Fig. 2 made on an enlarged scale; and

Fig. 6 is a section on the line 6—6 of Fig. 5.

The machine frame for supporting the operative parts may be of any usual type and as herein shown comprises a column 1 rising from a base 2 and surmounted by a table 3.

As shown in the present embodiment of the invention, two shaping cutters are mounted for treatment of the work alternately, and while said cutters may be variously contrived and mounted on the machine frame, one of the cutters is shown as mounted upon or having a shaft extending through the table 3, while the other cutter is mounted above the table. This construction has been found in practice to be efficient and well calculated for carrying out the objects of the present invention, but the invention is not necessarily limited thereto, as the cutters may be otherwise supported for operative relation upon the work. As shown, there are two cutters, as above stated, one of which is mounted for rotative movement in a fixed position and the other of which is mounted for rotative movement in variable positions relative to the fixed cutter.

The fixed cutter 4 is mounted upon the cutter shaft 5 extending upwardly through the table 3 and is driven by a suitable motor 6, and inasmuch as it is sometimes desirable to adjust the position vertically of the fixed cutter 4, the motor 6 is shown as adjustably supported by the machine frame. To this end the motor casing has secured thereto the collar or arm 7 having a lug 8 through which passes a screw 9 which is itself held from vertical movement by a bracket 10 and is provided with a beveled gear 12 which meshes with a similar beveled gear 13 on a frontwardly extending shaft 14 to which is secured the hand wheel 15, the construction being such that upon rotation of the hand wheel the motor, and perforce, the fixed cutter, may be vertically adjusted.

Encircling the shaft of the fixed cutter is the gear 16, Figs. 1 and 3, the upwardly extending sleeve whereof has the rack gear 17, which, as will be hereinafter described, imparts feeding movement to the work carrier. The gear 16 is driven by a train of gearing 18 and 19 from a short shaft 20 having the worm wheel 21 driven from a worm 22 which may itself be actuated from any source of power through the cone or variable speed pulleys 23.

In accordance with the present invention and as herein shown, the fixed cutter 4 has an upper and a lower cutting portion 24 and 25 in order that the fixed cutter may simultaneously shape the surfaces of two pieces of work presented thereto, as will hereinafter more fully appear, but it is to be understood that the invention is not restricted in this respect because the fixed cutter may be of any usual type.

As hereinbefore stated, the movable cutter shown in the present instance of the invention is mounted above the table 3 for movement towards and from the work relative to the fixed cutter. To this end the table 3 has mounted thereon the standard 26, Figs. 1 and 3, which may be adjustably secured to the table 3 by bolts 27 which pass through slots 28 in the base portion of the standard.

The standard 26 is provided with a guideway 29, as shown in Fig. 4, in which is mounted for sliding movement a carrier 30 for the movable cutter which may be adjusted vertically by means of a screw 31 having a grooved collar 32 to confine the screw from vertical movement relative to the carrier 30, and the screw 31 is threaded in a suitable lug or projection 33, Fig. 4, extending from the standard 26. At its upper end the adjusting screw 31 is provided with a hand wheel 34 by which the screw may be manipulated to raise or lower the carrier 30.

Mounted in bearings 35 extending from the carrier 30 is the movable cutter carrying shaft 36, Figs. 1 and 4, to which is secured by the collars 37 the arms 38 carrying the movable cutter casing 39. The collars 37 may be secured to the shaft 36 in any appropriate manner, but as shown, the pins 40 serve this purpose.

To facilitate ease of movement of the shaft 36 in its bearings 35, it is desirable at times to provide anti-friction balls or rollers 41, but this may not always be necessary.

The shaft 36, and perforce, the movable cutter casing and cutter carried thereby, is normally under the influence of means for moving the movable cutter towards the work relative to the fixed cutter, and any suitable yielding means may be employed for this purpose. In the present instance, however, the shaft 36 is extended upwardly from its upper bearing and has secured thereto a chain segment 42, Figs. 1, 3 and 4, to which is secured the chain 43 which leads from the segment 42 over the idle or guide pulley 44, and to its depending portion is secured a weight 45, the normal tendency of which is to move the shaft 36 in a direction to carry the movable cutter towards the work relative to the fixed cutter.

The movable cutter 46 may be formed with an upper and a lower cutting portion 47 and 48, similar in this respect to the fixed cutter 4, so that the movable cutter as well as the fixed cutter may act upon two pieces of work mounted upon the work carrier.

As more clearly shown in detail in Fig. 5, the movable cutter 46 is carried by the cutter shaft 49 which may be driven by any suitable means, such, for instance, as the electric motor 50 mounted in the cutter casing 39. The details of the movable cutter operating means and its bearings form no essential part of the present invention, but as shown in the detailed view of the movable cutter in Fig. 5, the cutter shaft 49 may be provided with roller or ball bearings 51 at its upper and lower portions to facilitate ease of rotative movement, and suitable lubricating devices 52 may be employed, but so far as the present invention is concerned these details are of minor importance. The movable cutter shaft 49 is herein shown as provided with a fan 53 and where the movable cutter is driven by an electric motor, as shown in the present instance of the invention, the movable cutter casing 39 may be provided with an opening 54 for the entrance of the electric wires, but so far as the broad features of the present invention are concerned, it is immaterial whether the movable cutter be electrically or mechanically driven, as the details of the driving means form no essential part of the present invention.

Secured to the movable cutter casing 39 is a collar 55, Fig. 5, having secured thereto by a bolt 56 the rigid arm 57 having a foot portion 58 to which is adjustably mounted a laterally extending arm 59 carrying a shoe 60, Fig. 5, which, as will hereinafter more fully appear, is to cooperate with means on the work carrier for determining the active and inactive periods of the movable cutter. The laterally extending arm may be appropriately secured to the foot 58 by a bolt 61, and, as indicated, an adjusting screw 62 affords means for adjusting the position of the shoe 60 to bring it into proper relation with the cutting edge of the movable cutter.

Inasmuch as the arm 57 is to sustain the thrust for moving the movable cutter away from the work, as will presently appear, it is herein shown as provided with strong flanges 63, and at its upper end is provided with a screw 64 bearing upon the movable cutter casing 39, whereby the arm 57 may sustain the thrust with flexure.

From the construction thus far described it will be apparent that the present invention provides a fixed cutter mounted for rotative movement in fixed position and a movable cutter mounted for rotative movement in variable positions relative to the fixed cutter, and such movable cutter is normally under the influence of means, shown as the weight 45, in the present instance, normally tending to move the movable cutter towards the work relative to the fixed cutter.

It is now proper to exploit the work carrier and its construction and mode of operation. Mounted for sliding movement in the table 3 towards and from the fixed and movable cutters is a work carrier slide 65, Figs. 3 and 4, having secured thereto a stud or non-rotative shaft 66 generally shown in Figs. 1, 2 and 3, and more particularly in detail in Fig. 5. Clamped to the stud shaft 66 by means of a bolt 67 is a cam carrying sleeve 68 provided with the cam 69 having raised portions 70 and depressed portions 71. The cam 69 is therefore fixed from rotative movement but movable with the work carrier slide 65. The purpose of the cam 69 is to automatically control the clamping and releasing movements of the work clamps, as will more fully appear.

The work carrier slide 65 has secured thereto a work carrier base 72 which, as indicated in Fig. 5 more in detail, may be connected by arms 73 at intervals to the upwardly extending spider frame 74 by bolts 75, said spider frame being extended from a sleeve 76 mounted for rotative movement upon the stud shaft 66, and interposed between the stud shaft 66 and the spider frame is a bearing sleeve 77 which is connected to the spider frame by securing means such as screws 78.

In order that the spider frame 76 and the work carrier may rotate relatively to the fixed stud shaft 66 with ease of movement, the spider frame has a ball raceway 79 which bears upon balls 81 in the lower ball raceway 80, as indicated in Fig. 5.

The work carrier base 72 is secured to the spider frame arms 73 by the bolts 82, shown more in detail in Fig. 5, and the outer surface portion of the base 72 is provided with a rack 83, as shown in Fig. 1 which, when the work carrier is moved to its work presenting position, as indicated in Fig. 1, engages the teeth of the gear 17 which is rotated by the train of mechanism 16, 18 and 19 hereinbefore described, the construction being such that when the work carrier slide has been moved to work presenting position relative to the cutters, the rack 83 will engage the gear 17 and effect continuous movement of the work carrier to position the work thereon in operative relation past the cutters.

In accordance with the present invention, the work carrier is provided with a work support or datum member 84 which, in the present instance, is formed with an upper work supporting surface and a lower work supporting surface upon which two pieces of work, one above the other, may be secured by automatically acting work clamping means.

As more clearly indicated in Fig. 1, the work support or datum member 84 is provided with positioning pins 85 extending from the work supporting surface, which are adapted to engage the end portion of and position the work. Extending from a block or projection 86 are the positioning screws 87 which further serve to position the work relative to the work support and maintain the work from retrograde movement relative to the work support during the action of the cutters.

In accordance with the present invention, the work carrier is provided with automatically acting clamping members, one for clamping a piece of work upon the upper and the other for clamping a piece of work on the under surface of the work support 84, and such clamping members consist of radially disposed arms pivotally connected together between their end portions and having their inner ends provided with bearings which rest upon the stationary cam 69.

Each of the upper clamping members comprises a radially extending arm 88 which is pivotally connected to a corresponding radially extending arm 89 of the clamping lower member by a pin 90 extending through projecting lugs of the radially extending arms 88 and 89, as more clearly indicated in Fig. 5. Adjustably secured to the radially extending arms 88 and 89 respectively are the upper and lower roller carrying arms 91 and 92, each of which has a roller 93, 94, resting upon the stationary cam 69. The roller carrying arms 91, 92 may be conveniently secured adjustably to the arms 88 and 89 respectively by pins or screws 94ˣ. Each of the arms 88 and 89 is provided with a laterally extending clamp carrier 95 which may be similar in construction, and as shown, comprises grooved guide bars, to which are adjustably secured the radially extending clamps 96, preferably adjustably connected to the arms 95 by clamping members or bolts 97, the heads of which are received in grooves in the bars 95. The end portions of the work clamping arms 96 are adapted to bear upon the work W to maintain the work in proper position on the work support, and as indicated in Fig. 1, each of the work clamping arms 96 is provided with a radially extending slot whereby its radial projection relative to the work carrier may be varied to suit the conditions of the work. In the particular construction shown, Fig. 5, the radial arm 89 of the lower clamp is provided with a sleeve 98 which is mounted upon upstanding pins 99 supported by the spider frame and, as shown, by the arms 73 thereof, Fig. 5. Projecting from each of the radial arms 88, 89, are the lugs 100 through which passes the pin 101, the upper portion of which carries a spring 102 normally tending to separate the clamping arms of the upper and lower clamping members from the work, and perforce, likewise holding rollers 93 and 94 of the inner portions of said arms against the upper and lower cam surfaces of the stationary cam 69, the construction being such that as the work carrier is rotated about the stationary pin 66, the work clamping arms will automatically clamp and release the work in accordance with the dictates of the cam 69.

The stationary cam 69 is contrived and shaped so that while the work is being presented to the cutters, the upper and lower work clamping members will bear upon the work and hold it on the work or datum support 84, but when the work has been completely shaped by the passage of the work past the cutters, and the work support is further rotated, the low part of the stationary cam 69 will be encountered by the rollers on the work clamping members and the clamps will be automatically opened to permit the work to be removed or changed relative to the work support.

Where the details of the automatic clamping and unclamping members are as hereinbefore described, it may be desirable at times to provide guides for directing the opening and closing movement of the clamping members, and to this end the spider frame has arising therefrom the guides 103 between which move the radial arms 88 and 89, and while such construction forms a good practical embodiment of this feature of the invention, the invention is not necessarily restricted to the details of the automatic clamping and unclamping members but may be varied within the true scope of this invention.

When the clamps are to be opened and the rollers 93 and 94 on the clamping members are opposite the low part of the stationary cam, it is desirable that the work releasing movement of both the upper and lower clamping members may be insured, and to this end the work carrier is provided with stops 104 which extend upward beneath the outer ends of the lower work clamps, so that the action of the spring 102 will not only cause the lower clamp to release the work but by engagement with the stops 104 will insure likewise that the action of the spring 102 will be transmitted to the upper arm to release the work. As shown, the upper work clamping arms are provided with adjustable clamping members 105 which may be secured to the upper clamping arms by suitable means, such as the adjusting screws 106. Such adjustable work clamping portions of the upper arms afford means for accurately insuring energetic action of the work clamps upon the work and may be employed in some cases, although they may not always be necessary.

From the construction described as a good practical form of the work carrier feature of the present invention, it will be manifest that when the work carrier is positioning the work for treatment by the cutters and is moving the work past the cutters, the work at this portion of the carrier will be securely clamped in position, whereas, the work at the other portions of the work carrier will be unclamped for removal that a new piece of work may be inserted in its place, and as the carrier is rotated after the completion of a piece of work into an inoperative position relative to the cutters, the piece of work completed will be released.

The work carrier slide is normally under the influence of means for moving the work carrier towards the cutters, and as shown in the present instance of the invention the slide 65 has secured thereto a flexible member 107 which passes over suitable guide pulleys 108 and 109, and has hanging thereto a weight 110, Fig. 4, the normal effect of which is to move the work carrier into work presenting position.

When the work carrier is moved frontwardly or from its position of presentation of the work to the cutters, the movable cutter will naturally follow the movement of the work carrier under the impulse of the weight 45, and in accordance with the present invention, this is prevented by the following train of mechanism, having reference more particularly to Fig. 3.

Mounted upon a rock shaft 111 carried by a bracket 112 is an arm 113 having a work carrier moving dog 114 which is adapted to engage with rack teeth 115 on the work carrier slide and is tripped from said engagement when the arm 113 is moved rearwardly. Extending downwardly from the rock shaft 111 and rigid with the arm 113 is the arm 116 connected by a rod 117 to a treadle operated lever 118 pivotally mounted at 119 to a bracket 120 depending from the table 3. Likewise secured to the rock shaft 111 is an arm 121, Fig. 3, having connected thereto the flexible member 122 which passes rearwardly over guide pulleys 123, 124, and is connected at its end, as indicated more clearly in Fig. 4, at 125 to the movable cutter frame, the effect being that on actuation of the treadle lever 118 by the machine attendant, not only will the work carrier be moved away from the cutters but the movable cutter itself will be moved backwardly away from the work carrier. A holding and release pawl 111$^x$ and suitable trip is shown.

An important feature of the invention, as hereinbefore generally pointed out, is the provision of means for automatically determining the alternate action of cutters upon the work in order to shape the work by cutting action with the grain of the wood throughout the surface to be shaped. The work carrier is provided with a pattern formed in accordance with the general contour of the work to be shaped, such pattern in the present instance comprising a track or cam guide shown as formed as part of or secured to the work carrier and having a raised surface 126 and a depressed surface 127 joined by an inclined portion 128, the said track being caused to bear continually upon the guide 129 axially arranged with reference to the fixed cutter, as indicated in Fig. 1, the construction being such that when the low portion 127 of the track bears upon the guide 129, the fixed cutter will be operatively related to and will act upon the work, but when the raised portion 126 of the track is passing the guide 129, the work carrier will be moved away from the fixed cutter and the work will be held out of engagement with this cutter.

The work carrier is further provided with another track, shown in the present instance as disposed above the track just described, and such second track has a depressed portion 130 and a projection portion 131 to control the operative action of the movable cutter upon the work, the construction being such that when the low portion of the track controlling the movable cutter is passing by that cutter, the movable cutter will be permitted to engage and operate upon the work, and when the high portion of said track passes the movable cutter, such movable cutter will be held out of operative relation with the work as the work carrier is continuously fed past the cutters. Thus the cutters are controlled in their action upon the work to cause first one and then the other to perform its cutting operation in conformity with the grain of the work.

Under the conditions indicated in Fig. 1, the fixed cutter is starting its inactive relation with the work by movement of the work carrier away from the fixed cutter by reason of the projecting or high portion 126 of the track, whereas, the movable cutter is permitted by the low portion of its track 131 to move into cutting relation with the work, and as the movable cutter is rotated in a direction opposite the rotation of the fixed cutter, it will act upon the work in the direction of the grain during its period of activity, and as it goes out of action owing to the high portion of the track, the fixed cutter which is rotated in an opposite direction, acts upon the work also in the direction of the grain, the result being that the surface to be shaped is treated by the two cutters alternately under automatic control to complete the surface to be shaped by cuts in the direction of the grain of the work.

Where the work is to have a concave and a convex surface shaped, as shown in the present instance of the invention, the work carrying portions of the work carrier may be provided with a pattern on one portion to complete the concave surface of the work by the alternate action of the two cutters in the direction of the grain of the work, and may have other portions formed for treatment of the convex surface of the work alternately by the two cutters acting in the direction of the grain of the work.

In Fig. 2 the work W is shown as having a convex surface thereof shaped by the cutters, and in this case the movable cutter 46, which is rotated in the direction of the arrow, first acts upon the work to shape the convex surface in the direction of the grain of the work, while the work itself is held from the fixed cutter 4 by the high portion 126 of the track bearing against the guide 129 of the fixed cutter, and when the movable cutter has shaped its portion of the work and prior to its going out of action, the fixed cutter, which rotates in the opposite direction, acts upon the work under the dictates of the lower portion 127 of the track passing the guide 129. In shaping the convex surface of the work both cutters may act for a time simultaneously upon the work, but where the grain of the work changes distinctly, the cutter which would otherwise act against the grain is automatically moved out of operative relation with the work, while the other cutter which acts with the grain continues in operation.

Applicant believes himself to be the first in the art to provide a wood shaping machine for shaping the surfaces of the work by two or more cutters acting alternately upon the work to complete shaping of a surface of the work during a continuous passage of the work past the cutters, and while the tracks hereinbefore described are found to be a good practical form of means for effecting such automatic alternate action of the cutters upon the work, it is to be understood that applicant's invention is not restricted to the particular means, such as the tracks with raised and low portions as hereinbefore described, but is generic to any means that may bring about the continuous treatment of a surface of the work in the direction of the grain of the work to complete the shaping of such surface by automatic alternate action of the cutters thereon, and while the invention has been described in connection with two cutters only, one of which is fixed, it is not restricted thereto, since any desired number of cutters may be provided and automatically controlled by a suitable number of tracks or guiding means to determine the time and place of action of each cutter, as the work is fed past the cutters.

What is claimed is:

1. In a wood shaping machine, the combination of two cutters rotating in opposite directions, a work carrier for presenting the work to both cutters, means for moving the work carrier in a curved path past both cutters, and means for automatically causing one of the cutters to act upon the work in the direction of the grain and, when the direction of the grain changes, for automatically causing the other cutter to act upon the work in the direction of the grain.

2. In a wood shaping machine, the combination of two shaping cutters rotating in opposite directions, a work carrier, means for continuously moving the work carrier in a curved path past the cutters, and means for automatically causing one cutter to act upon the work in the direction of the grain and, where the direction of the grain changes, for automatically causing an oppositely rotating cutter to act upon the work in the direction of the grain.

3. In a wood shaping machine, the combination of a fixed cutter and a relatively movable cutter constructed and arranged to act alternately upon the work to complete the shaping of one surface of the work, a work carrier mounted for rotative movement relative to the cutters about a central axis and for movement bodily toward and from the cutters, means for rotating the work carrier to feed the work relative to the cutters, and means on the work carrier for controlling the engagement of each of the cutters with the work.

4. In a wood shaping machine, the combination of a fixed cutter and a relatively movable cutter that rotate in opposite directions to act upon different portions of the work, a work carrier mounted for rotative movement relative to the cutters and for movement bodily toward and from the cutters, a profile surface upon the work carrier for controlilng the movement of the carrier into work engaging position, and a second profile surface upon the carrier for controlling the engagement of the movable cutter with the work.

5. In a wood shaping machine, the combination of a fixed cutter and a relatively movable cutter that rotate in opposite directions to act upon different portions of the work, a work carrier mounted for feeding movement past the cutters and for movement bodily toward and from the cutters, a profile surface upon the carrier adapted to rest against a non-yielding stop adjacent the fixed cutter to control the movement of the work against the fixed cutter, and a second profile surface upon the carrier for controlling the engagement of the movable cutter with the work.

6. A wood shaping machine, comprising, in combination, two cutters rotating in opposite directions, a work carrier mounted for rotative movement relative to the cutters and for movement bodily towards and from the cutters, means for continuously feeding the work carrier past the cutters for treatment of the work by either, means tending to move the carrier towards the cutters, and means for automatically causing the cutters to act alternately upon the work to complete the shaping of the work.

7. In a wood-shaping machine, the combination of a fixed cutter and a relatively movable cutter positioned to act upon the work, a work carrier mounted for rotative movement and for movement bodily toward and from the fixed cutter to engage different portions of its work with the cutter, a profile surface upon the carrier adapted to rest against a non-yielding stop adjacent the fixed cutter to control the engagement of the work with the cutter, and a second profile surface upon the carrier for controlling the engagement of the movable cutter with the work.

8. A wood working machine, comprising, in combination, a shaping cutter mounted in fixed position for rotation in one direction, another shaping cutter bodily movable relative to the first cutter and rotating in the opposite direction, a work carrier, means for continuously rotating the work carrier so that it advances the work in a curved path past the cutters for their alternate action upon the work, and means for automatically causing one of the cutters to act upon the work in the direction of the grain.

9. A wood working machine, comprising, in combination, a shaping cutter mounted in fixed position for rotation in one direction, another shaping cutter bodily movable relative to the first cutter and rotating in the opposite direction, a work carrier, means for continuously rotating the work carrier so that it advances the work in a curved path past the cutters for their alternate action upon the work, and means for determining automatically which one of the cutters shall act upon the work as the carrier is moved past the cutters.

10. In a shaper, the combination of a fixed shaping cutter rotating in one direction, a relatively movable shaping cutter rotating in the opposite direction, a work carrier, means for automatically moving the work carrier to present the work to the cutters, and means for rendering the movable cutter inoperative relative to the work during the treatment of the work by the fixed rotating cutter and for rendering the fixed cutter inoperative relative to the work during the treatment of the work by the movable rotating cutter.

11. In a wood shaping machine, the combination of a pair of rotating cutters, supported to act upon the work, a work carrier mounted for feeding movement past the cutters and movable bodily toward and from the cutters in a direction at approximately right angles to the direction in which the portion of the work engaged by a cutter is advanced past the cutter, a profile surface upon the carrier adapted to engage a non-yielding stop to control the movement of the carrier toward and from one of the cutters, and a second profile surface upon the carrier for controlling the engagement of the second cutter with the work.

12. In a wood shaping machine, the combination of a rotating cutter mounted in fixed position, a work carrier mounted for movement toward and from the fixed cutter and provided with means for feeding the work upon the carrier past the cutter, a pattern on the carrier, a guide supported in a fixed position and adapted to engage the pattern and control the engagement of the work with the fixed cutter, a second cutter mounted for movement relative to the fixed cutter and provided with pattern engaging means for controlling its engagement with the work, and said movable cutter being adapted to partake of the movement of the carrier toward and from the fixed cutter and also of its movement relative to the carrier in response to the control of its pattern engaging means.

13. In a shaping machine, the combination of a work carrier mounted for movement bodily toward and from the cutters to engage the work with the cutters and for a second movement to feed the work past the cutters, a rotating shaping cutter, a second shaping cutter rotating in the opposite direction to the first cutter, means for advancing the carrier relatively to the cutters to feed the work against the cutters, means normally acting to move one of the cutters towards the work carrier, and guide means for determining which one of the cutters shall act upon the work.

14. In a shaping machine, the combination of a carrier slide mounted for movement toward and from the cutters, a work carrier rotatably mounted upon the slide, a rotating shaping cutter, a second shaping cutter rotating in the opposite direction to the first cutter, means for moving the slide and work carrier toward the cutters, means for rotating the carrier upon its slide to feed the work relatively to the cutters, means normally acting to move one of the cutters towards the work, and guide means for determining which one of the cutters shall act upon the work.

15. In a wood shaping machine, the combination of a work carrier movable towards and from the cutters and having a pattern in conformity with the article to be shaped, a non-yielding guide against which the pattern bears, a fixed cutter for treating the work in conformity with the pattern, a second cutter for treating the work in conformity with the pattern and mounted for bodily movement relative to the fixed cutter, and means between the work carrier and cutters for automatically determining which of the cutters shall act upon the work as it is fed past the cutters.

16. In a wood shaping machine, the combination of a work carrier having a pattern that may be given an irregular profile, a guide against which the pattern bears, a fixed cutter for treating a part of the work in conformity with the pattern and relatively to which the work moves in conformity with the profile of the pattern, a second cutter for treating another part of the work in conformity with the pattern and mounted for bodily movement towards and from the work, and means for determining automatically which one of the cutters shall act upon the work as it is fed past the two cutters.

17. In a wood shaping machine, the combination of a work carrier having a pattern that may be given an irregular profile, a guide against which the pattern bears, a fixed cutter for treating a part of the work in conformity with the pattern and relatively to which the work moves in conformity with the pattern, a second cutter for treating another part of the work in conformity with the pattern and mounted for bodily movement towards and from the work, means for continuously moving the work carrier past both cutters, and means for determining automatically which one of the cutters shall act upon the work as it is fed past the two cutters.

18. In a wood shaping machine, the combination of two cutters, one of which is rotated in a fixed position and the other of which is rotated in variable positions relative to the fixed cutter, a work carrier mounted for movement bodily towards and from the cutter and having a pattern, means for moving the work carrier towards the cutters and separate means for feeding the work past the cutters in position for the action of either cutter in conformity with the pattern, and means for causing the cutters to alternately act upon the work as it is moved past the cutters.

19. In a wood shaping machine, the combination of two cutters, one of which is rotated in a fixed position and the other of which is rotated in variable positions relative to the fixed cutter, a work carrier mounted for movement toward and from the cutters and having a pattern, means for moving the work carrier towards and past both cutters in position for the action of either cutter in conformity with the pattern, and projections on the carrier for alternately holding one of the cutters out of action relative to the work during the action of the other cutter as the work is fed past both cutters.

20. In a wood working machine, the combination of a cutter mounted for rotative movement in fixed position, a movable cutter mounted for rotative movement in different positions relative to the fixed cutter, a work carrier having a pattern, means for urging the work carrier towards and feeding it past the two cutters, means normally acting to move the movable cutter towards the work carrier, a track on the carrier for holding the movable cutter away from the work during part of the passage of the work past the cutters and a second track on the carrier for holding the work away from the fixed cutter during the action of the movable cutter.

21. In a wood working machine, the combination of a cutter mounted for rotative movement in fixed position, a movable cutter mounted for rotative movement in different positions relative to the fixed cutter, a work carrier having a pattern, means for urging the work carrier towards and feeding it past the two cutters, a fixed guide against which the pattern rests, means normally acting to move the movable cutter towards the work carrier, a track on the carrier for holding the movable cutter away from the work during part of the passage of the work past the cutters and a second track on the carrier for holding the work away from the fixed cutter during the action of the movable cutter.

22. In a wood working machine, the combination of a cutter mounted for rotative movement in fixed position, a movable cutter mounted for rotative movement in different positions relative to the fixed cutter, a work carrier for presenting the work for treatment by either cutter, means normally acting to move the movable cutter towards the work, means for holding the movable cutter away from the work during treatment of the work by the fixed cutter, and means for holding the work away from the fixed cutter during treatment of the work by the movable cutter.

23. In a wood shaper, the combination of a cutter mounted for rotative movement in fixed position, a movable cutter mounted for rotative movement in different positions relative to the fixed cutter, a work carrier movable towards and from the cutters, means for yieldingly moving it towards the cutters for treatment of the work by either cutter, and means for relatively positioning the work and cutters as the work is fed past the cutters to cause first one and then the other cutter to treat the work.

24. In a wood shaper, the combination of a cutter mounted for rotative movement in fixed position, a movable cutter mounted for rotative movement in different positions relative to the fixed cutter, a work carrier, means for yieldingly moving it towards the cutters for treatment of the work by either cutter, and a track on the carrier having raised and depressed portions for controlling the alternate action of the fixed and movable cutters as the work is continuously fed past the cutters.

25. In a wood shaping machine, the combination of a table, a rotating cutter mounted in fixed position, a movable cutter mounted for rotative movement in different positions relative to the fixed cutters, one of said cutters being disposed above the table, a work carrier, means for yieldingly moving it towards the cutters for treatment of the work by either cutter, and means for relatively positioning the work and cutters as the work is fed past the cutters to cause alternate treatment of the work by both cutters.

26. In a wood shaping machine, the combination of a table, a rotating cutter mounted in fixed position, a movable cutter mounted for rotative movement in different positions relative to the fixed cutters, one of said cutters being disposed above the table, a work carrier having a work support, means for clamping two similar pieces of work, one above and the other below said support, means for yieldingly moving the work support towards the cutters for treatment of the work by either cutter, and means for relatively positioning the work and cutters as the work is fed past the cutters to cause alternate treatment of the work by both cutters.

27. In a wood shaping machine, the combination of a rotating cutter mounted in fixed position, a movable cutter mounted for swinging movement into different positions relative to the fixed cutter, a work carrier mounted for movement bodily toward and from the fixed cutter and having a pattern, means for moving the work carrier toward the fixed cutter and for feeding it past both cutters to present the work to the action of either cutter, means normally acting to swing the movable cutter towards the work, means for automatically causing one of the cutters to act upon one part of the work in conformity with the pattern and the other cutter to act upon a succeeding part of the work in conformity with the pattern to complete the shaping of the same surface of the work, and manual means for swinging the movable cutter away from the work at will.

28. In a wood shaping machine, the combination of a rotating cutter mounted in fixed position, a movable cutter mounted for swinging movement into different positions relative to the fixed cutter, a work carrier mounted for movement toward and from the fixed cutter and having a pattern, means for moving the work carrier towards the fixed cutter and for feeding it past both cutters to present the work to the action of either cutter, means normally acting to swing the movable cutter towards the work, means for automatically causing one of the cutters to act upon one part of the work in conformity with the pattern and the other cutter to act upon a succeeding part of the work in conformity with the pattern to complete the shaping of the same surface of the work, and manaual means for moving the work carrier away from the cutters and the swinging cutter away from the work at will.

29. In a wood shaping machine, the combination of two cutters, one of which is rotated in a fixed position and the other of which is rotated in variable positions relative to the fixed cutter, a work carrier mounted for movement towards and from the fixed cutter and having a pattern, means for moving the work carrier towards and from the fixed cutter and for feeding it past both cutters in conformity with the pattern, means for causing the cutters to alternately act upon the work as it is moved past the cutters, and manual means for moving the work carrier away from the cutters and the movable cutter away from the work carrier.

30. In a wood shaping machine, the combination of a fixed cutter and relatively movable cutter constructed and arranged to alternately act upon the work to complete the shaping of one surface of the work, a work carrier slide, a work carrier rotatively supported on the slide, means for automatically causing first one and then the other cutter to act upon the work, a clamp for securing the work on the carrier, and means for alternately closing and opening the clamp as the work carrier is rotated.

31. In a wood shaping machine, the combination of a fixed cutter and relatively movable cutter constructed and arranged to alternately act upon the work to complete the shaping of one surface of the work, a work carrier slide, a work carrier rotatively supported on the slide, means for automatically causing first one and then the other cutter to act upon the work, a clamp for securing the work on the carrier, and automatic means for closing the clamp upon the work as the work is moved towards operative position and for releasing the clamp as the work is moved away from operative position relative to the cutters.

In testimony whereof, I have signed my name to this specification.

WILLIAM M. WHITNEY.